United States Patent
Al-Qahtani

(10) Patent No.: US 10,330,210 B2
(45) Date of Patent: Jun. 25, 2019

(54) UTILIZING CLEAN GAS TO RELIABLY OPERATE MAIN AND PILOT RELIEF VALVE

(71) Applicant: Saudi Arabian Oil Company, Dhahran (SA)

(72) Inventor: Mohammad Ali Al-Qahtani, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 252 days.

(21) Appl. No.: 15/208,259

(22) Filed: Jul. 12, 2016

(65) Prior Publication Data

US 2018/0017178 A1    Jan. 18, 2018

(51) Int. Cl.
  *F16K 17/04*    (2006.01)
  *F16K 17/10*    (2006.01)

(52) U.S. Cl.
  CPC .............. *F16K 17/04* (2013.01); *F16K 17/10* (2013.01)

(58) Field of Classification Search
  CPC .... F16K 17/04; F16K 17/10; Y10T 137/7762; Y10T 137/7764; Y10T 137/7769; Y10T 137/777
  USPC .............................. 137/488, 489, 492, 492.5
  See application file for complete search history.

(56) References Cited

U.S. PATENT DOCUMENTS

| | | | |
|---|---|---|---|
| 2,576,516 A | 11/1951 | Jurs | |
| 3,055,629 A | 9/1962 | Jurs et al. | |
| 3,477,456 A * | 11/1969 | Powell | F16K 17/105 137/171 |
| 3,722,852 A * | 3/1973 | Powell | F16K 17/105 251/175 |
| 4,669,493 A * | 6/1987 | Kober | B63B 25/12 137/489 |
| 5,056,555 A | 10/1991 | Frijlink | |
| 5,246,034 A | 9/1993 | Higgins et al. | |
| 5,555,910 A | 9/1996 | Powell et al. | |

(Continued)

FOREIGN PATENT DOCUMENTS

DE    2605015 A1    8/1977

OTHER PUBLICATIONS

International Search Report and Written Opinion for related PCT application PCT/US2017/041671 dated Nov. 3, 2017.

*Primary Examiner* — Eric Keasel
(74) *Attorney, Agent, or Firm* — Bracewell LLP; Constance G. Rhebergen; Linda L. Morgan

(57) ABSTRACT

A relief valve assembly including a main relief valve and a pilot relief valve. The main relief valve is positioned adjacent a valve seat of a pressure vessel containing a sour gas. The main relief valve includes a main valve diaphragm selectively sealable against the valve seat of the pressure vessel and enclosing a valve dome containing an inert clean gas and includes a hollow valve tube in pressure communication with the valve dome. The pilot relief valve is in pressure communication with the pressure vessel and the valve dome, and includes a pilot seat selectively sealable against the hollow valve tube. The pilot relief valve includes a biasing mechanism in communication with the pilot seat to urge the pilot seat toward sealed engagement with the hollow valve tube and a sense diaphragm attached to the pilot seat and enclosing a sense cavity in pressure communication with the valve dome.

13 Claims, 1 Drawing Sheet

(56) References Cited

U.S. PATENT DOCUMENTS 5,992,449 A 11/1999 Sprague
2010/0059694 A1* 3/2010 Olander .................. F17C 5/00
250/492.3

* cited by examiner

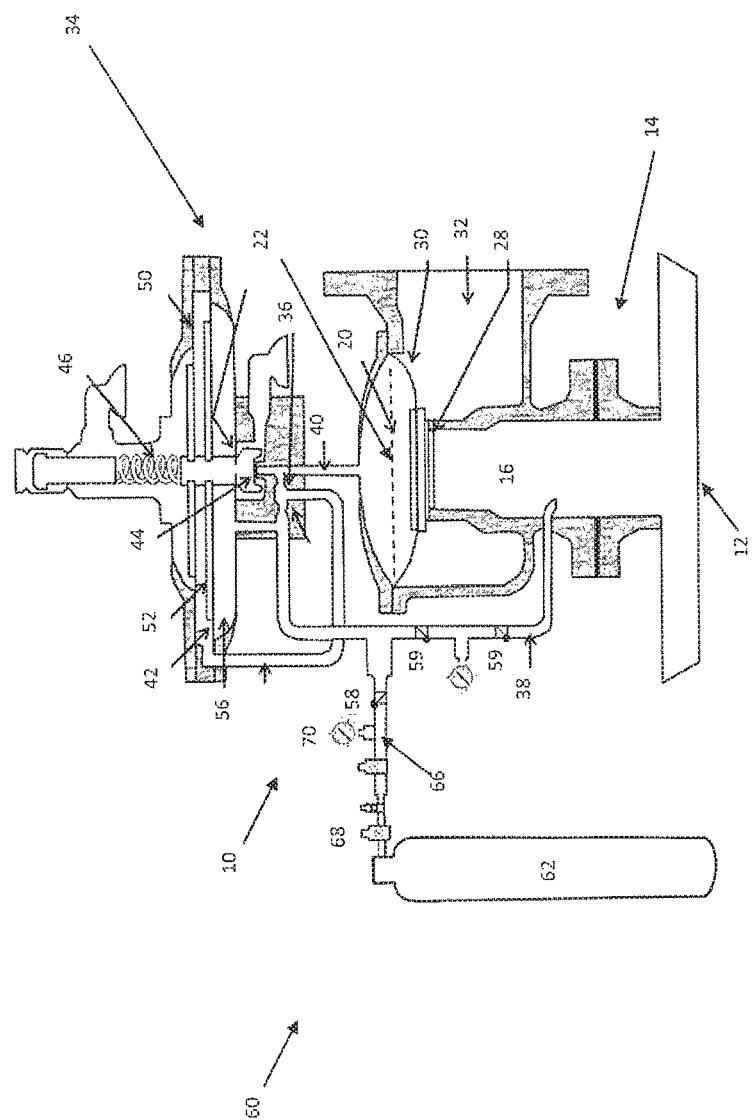

UTILIZING CLEAN GAS TO RELIABLY OPERATE MAIN AND PILOT RELIEF VALVE

BACKGROUND

Field

Embodiments disclosed herein relate generally to pressure relief systems for pressure vessels. In particular, embodiments herein relate to pressure relief systems utilizing pilot relief valves.

Description of the Related Art

Pressure relief systems are used in pressure tanks, pressure vessels, such as to depressurize storage tanks and pressure vessels. Typically, a pressure relief valve is employed with storage tanks and pressure vessels to vent off excessive internal pressure when a predetermined pressure or an abnormally high pressure or an unsafe pressure value is reached.

Pilot relief valves are often employed in pressure relief systems to open and close a main relief valve. Pilot relief valves can relieve pressure in a vessel by limiting the pressure rise in a vessel. Another purpose of the pilot relief valve is to control gas flow for the main relief valve without any auxiliary control valves.

In systems where a pressure vessel contains a sour gas, or other gas that may contain contaminates, pressure relief valves can become corroded, or can otherwise be damaged by the contaminates and deposits left behind on components by such sour gas. Such corrosion and deposits can build up over time until the valve fails or requires maintenance.

SUMMARY

One embodiment of the present technology provides a relief valve assembly including a main relief valve positioned adjacent a valve seat of a pressure vessel containing a sour gas. The main relief valve includes a main valve diaphragm selectively sealable against the valve seat of the pressure vessel and enclosing a valve dome containing an inert clean gas and includes a hollow valve tube in pressure communication with the valve dome. The pilot relief valve is in pressure communication with the pressure vessel and the valve dome of the main relief valve, and includes a pilot seat selectively sealable against the hollow valve tube. The pilot relief valve includes a biasing mechanism in communication with the pilot seat to urge the pilot seat toward sealed engagement with the hollow valve tube. The pilot relief valve further includes a sense diaphragm attached to the pilot seat and enclosing a sense cavity in pressure communication with the valve dome and the pressure vessel so that when a pressure in the pressure vessel exceeds a predetermined level, pressure within the sense cavity urges the sense diaphragm and the pilot seat away from the hollow valve tube, which in turn allows compression of the valve diaphragm so that it separates from the valve seat, thereby allowing sour gas to escape from the pressure vessel.

In some embodiments, the relief valve assembly can further include an equalizing line for sensing and substantially equalizing the pressure in each of the valve dome, the sense cavity, and the pressure vessel. The relief valve assembly can include at least one check valve attached to the equalizing line for separating the sour gas from the inert clean gas. In addition, the biasing mechanism can include a spring and the valve dome can be expandable in a direction perpendicular to a central dome axis between a first relaxed position and a first expanded position. Furthermore, the pressure inside of each of the valve dome, the sense cavity, and the pressure vessel can be substantially equal at a pressure of about 3 psig or more and less than or equal to about 7 psig. In addition, the pilot relief valve can contain nitrogen gas at a pressure of about 7 psig and up to 10 psig. Furthermore, the valve diaphragm can be operable to separate from the valve seat and open to release the sour gas to the atmosphere when the predetermined level is about 10 psig or more.

In some embodiments, the relief valve assembly can further include a boost diaphragm attached to the pilot seat and a boost cavity enclosed by the boost diaphragm and the sense diaphragm. The boost cavity can be in pressure communication with the valve dome and the pressure vessel so that when a pressure in the pressure vessel exceeds a predetermined level, pressure within the boost cavity urges the boost diaphragm and the pilot seat away from the hollow valve tube, which in turn can allow compression of the valve diaphragm so it separates from the valve seat, thereby allowing sour gas to escape from the pressure vessel. In addition, the biasing mechanism can apply a downward force to urge the pilot seat towards the hollow valve tube, which in turn can allow expansion of the valve diaphragm so that it seals against the valve seat, thereby preventing sour gas from escaping from the pressure vessel.

Another embodiment of the present technology provides an inert clean gas relief valve system for maintaining the cleanliness of internal components. The inert clean gas relief valve system includes the relief valve assembly, a gas cylinder containing an inert clean gas, a gas line for fluidly connecting the gas cylinder and the relief valve assembly and for transporting the inert clean gas from the gas cylinder to the relief valve assembly, and at least one pressure regulator positioned in the gas line for controlling the flow rate of the inert clean gas from the gas cylinder. The relief valve assembly includes the main relief valve positioned adjacent the valve seat of the pressure vessel containing a sour gas. The main relief valve includes the main valve diaphragm selectively sealable against the valve seat of the pressure vessel and enclosing the valve dome containing an inert clean gas and includes the hollow valve tube in pressure communication with the valve dome. The pilot relief valve is in pressure communication with the pressure vessel and the valve dome of the main relief valve, and includes the pilot seat selectively sealable against the hollow valve tube. The pilot relief valve includes the biasing mechanism in communication with the pilot seat to urge the pilot seat toward sealed engagement with the hollow valve tube. The pilot relief valve further includes the sense diaphragm attached to the pilot seat and enclosing the sense cavity in pressure communication with the valve dome and the pressure vessel so that when a pressure in the pressure vessel exceeds a predetermined level, pressure within the sense cavity urges the sense diaphragm and the pilot seat away from the hollow valve tube, which in turn allows compression of the valve diaphragm so that it separates from the valve seat, thereby allowing sour gas to escape from the pressure vessel. In addition, the gas cylinder can supply the inert clean gas to the relief valve assembly at a steady flow rate of about 7 psig. In addition, the inert clean gas relief valve system can include at least one check valve positioned in the gas line for preventing the inert, clean gas from mixing with the sour gas. Furthermore, the inert clean gas relief valve system can include the pressure gauge disposed in between the at least one pressure regulator and the relief valve for measuring and displaying the pressure of the inert clean gas as it enters the relief valve.

Yet another embodiment of the present technology provides a method of regulating pressure in the vessel including (a) sealing the pressure vessel containing the sour gas by attaching the main relief valve to the outlet of the pressure vessel, the main relief valve having a valve diaphragm that encloses a valve dome and seals against the outlet, and the hollow valve tube in pressure communication with the valve dome, the valve dome containing an inert clean gas, (b) sealing the valve dome by attaching a pilot relief valve with a pilot valve seat to the hollow valve tube so that the pilot valve seat selectively seals the valve dome and hollow valve tube, (c) biasing the pilot valve seat toward the pilot hollow valve tube, (d) when pressure within the vessel reaches a predetermined level, moving the pilot valve seat away from the hollow valve tube to allow the inert clean gas to escape from the valve dome via the hollow valve tube, and (e) when the pilot valve seat moves away from the hollow valve tube, moving the valve diaphragm away from the outlet so that sour gas within the vessel escapes and pressure within the vessel reduces. In addition, the method of regulating pressure in the vessel can further include the steps of (f) when pressure within the pressure vessel reduces to at or below a predetermined level, applying a downward force to close the pilot seat towards the hollow valve tube, which allows expansion of the valve diaphragm so that it seals against the valve seat, thereby preventing sour gas from escaping from the pressure vessel, and (g) when the pressure inside of the pilot relief valve is about 9.3 psig or less, sealing the valve seat to prevent the sour gas from escaping from the pressure vessel to the atmosphere.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

FIG. 1 shows a side cross-sectional view of an inert clean gas relief valve system according to an embodiment of the present technology.

DETAILED DESCRIPTION

The foregoing aspects, features, and advantages of the present technology will be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art will appreciate that the following description has broad application, and the discussion of any embodiment is meant only to be exemplary of that embodiment, and not intended to suggest that the scope of the disclosure, including the claims, is limited to that embodiment.

FIG. 1 shows a side cross-sectional view of a gas relief valve system 60 according to an embodiment of the present technology. The gas relief valve system 60 includes a relief valve assembly 10, a gas cylinder 62 containing an inert, clean gas, such as nitrogen gas, a gas line 66, and at least one pressure regulator 68. Certain features of the relief valve assembly 10 further include a main relief valve 14 and a pilot relief valve 34. The inert, clean gas may be, for example, pure nitrogen or primarily nitrogen with additional gas components. The gas cylinder 62 contains the nitrogen gas, which is transported to the relief valve assembly 10 via the gas line 66 disposed in between the gas cylinder 62 and the relief valve assembly 10. As the nitrogen gas moves within the gas line 66, at least one pressure regulator 68, which is attached to the gas line 66 and is disposed in between the gas cylinder 62 and the relief valve assembly 10, controls the flow rate of the nitrogen gas from the gas cylinder 62. In certain embodiments, the gas cylinder 62 supplies the nitrogen gas to the relief valve assembly 10 at a steady flow rate resulting in a constant pressure of about 7 psig within the gas line 66. In certain embodiments, the gas relief valve system 60 may include a pressure gauge 70, which is disposed in between the at least one pressure regulator 68 and the relief valve assembly 10, for measuring and displaying the pressure of the nitrogen gas as it enters the relief valve assembly 10.

The gas line 66 is in fluid communication with the equalizing line 38, which connects the pressure vessel 12 to different portions of the gas relief valve system 60 to equalize the pressure between the pressure vessel 12 and components of the relief valve system 60. For example, the equalizing line 38 provides nitrogen gas to components of the relief valve assembly 10, and is in fluid communication with the relief valve assembly 10. In certain embodiments, at least one first check valve 58, which may be a one-way check valve, is attached to the gas line 66 and may prevent sour gas from entering into the gas relief valve system 60 and mixing with the nitrogen gas. In certain embodiments, at least one second check valve 59, which may be a one-way check vale, is attached to the equalizing line 38 and may prevent the nitrogen gas from entering the pressure vessel 12 and mixing with the sour gas. The at least one of the first check valve 58 and the at least one second check valve 59 prevents the nitrogen gas from mixing with a sour gas from the pressure vessel 12 and regulating a substantially equal pressure within the equalizing line 38. In some embodiments, a needle valve can take the place of the equalizing line 38, yet achieve the same function of the equalizing line 38 of the present technology.

The relief valve assembly 10, which may be, for example, a TYCO Model RV-1 Pressure Relief Valve or a similar valve, can be integrated into the gas relief valve system 60 or can be functional as a separate standalone device. In certain embodiments, the relief valve assembly 10 can be a retrofit unit onto a pressure vessel 12. The pressure vessel 12 may comprise a tank having a fluid or gas stored therein, and which is in fluid communication with the relief valve assembly 10. The relief valve assembly 10 is attached to the pressure vessel 12 by the main relief valve 14 at the valve seat 28.

The main relief valve 14 is positioned adjacent the valve seat 28 of the pressure vessel 12 containing the sour gas. The main relief valve 14 includes a valve diaphragm 30 selectively sealable against the valve seat 28 of the pressure vessel 12. Thus, for example, the main relief valve 14 encloses the pressure vessel 12 through the sealed engagement of the valve seat 28. The main relief valve 14 may include a hollow section 16 that permits entry of the sour gas from the pressure vessel 12, and which collects the sour gas while the valve seat 28 remains sealed. The sour gas in the pressure vessel 12 may include a pure gas or a gas mixture, which may include, for example, a natural gas, a gas containing hydrogen sulfide, or acid gas, or a range of components of gases of a mol percentage of about 3 percent of nitrogen, with remaining gas components, including but not limited to, any or all of carbon dioxide, hydrogen sulfide, methane, ethane, propane, i-Butane, n-Butane, i-Pentane, n-Pentane, hexanes, heptane, octane, nonane, and decane gases at varying mol percentages.

The valve diaphragm 30 encloses a valve dome 20, which contains nitrogen gas. The main relief valve 14 includes a hollow valve tube 40, which may be a tube pipe and which is in pressure communication with the valve dome 20. Thus, nitrogen gas is transported from the gas cylinder 62 via the gas line 66 into the equalizing line 38 into the hollow valve tube 40 into the valve dome 20. In certain embodiments, the valve dome 20 may be comprised of a flexible bladder material, such an elastomeric material, which may expand and contract as the valve operates to either seal against the valve stem 16, thereby sealing sour gas in the pressure vessel 12, or allow sour gas to escape from the pressure vessel 12. The direction of expansion of the valve dome 20 may be in a direction perpendicular to the central dome axis 22, which bisects the valve dome 20 along its longitudinal axis, between a relaxed position, in which sour gas is permitted to escape from the pressure vessel 12 through the valve seat 28, and an expanded position, in which sour gas is not permitted to exit the pressure vessel 12 and the pressure vessel 12 is sealed. In some embodiments, the valve dome 20 may not be flexible, and can instead be a solid structure the collects gas, such as the nitrogen gas from the gas cylinder 62.

The pilot relief valve 34 is in pressure communication with the pressure vessel 12 and the valve dome 20 of the main relief valve 14, and has a pilot seat 44 selectively sealable against the hollow valve tube 40. The pilot relief valve 34 includes a biasing mechanism 46 in communication with the pilot seat 44 to urge the pilot seat 44 toward sealed engagement with the hollow valve tube 40. In some embodiments, the biasing mechanism 46 can be a spring, such as, for example, a tension-extension spring, compression spring, torsion spring, constant spring, variable spring, coil spring, flat spring, machined spring, serpentine spring, cantilever spring, hairspring, leaf spring, constant-force spring, gas spring, ideal spring, mainspring, negator spring, progressive rate coil spring, wave spring, loaded spring, or a rubber band. The pilot relief valve 34 may further include a sense diaphragm 50 attached to the pilot seat 44 that encloses a sense cavity 42 in pressure communication with the valve dome 42 and the pressure vessel 12. The pilot relief valve 34 may further include a blowdown adjustment orifice 36, which can be a portion of the equalizing line 38 having a reduced diameter. One purpose of the blowdown adjustment orifice 36 may be to control the pressure within the main relief valve 14, by redirecting gas in between the main relief valve 14 and the pilot relief valve 34 through the equalizing line 38. In some embodiments, the blowdown adjustment orifice 36 may rapidly reduce the valve dome 20 pressure, so as to induce a 'snap' action. In certain alternate embodiments, the blowdown adjustment orifice 36 may slowly reduce the valve dome 20 pressure to modulate the pressure within the main relief valve 14.

In some embodiments, the pilot relief valve 34 may further include a boost diaphragm 52 attached to the pilot seat 44 enclosing a boost cavity 56 in pressure communication with the valve dome 20 and the pressure vessel 12. The boost diaphragm 52 equalizes and balances the pressure around the pilot relief valve 34, which may be, but is not limited to, the surrounding sealing, thereby creating a pressure sealing mechanism to keep the valve diaphragm 30 sealed against the valve seat 28 of the pressure vessel 12. The combination of the sense diaphragm 40 and the boost diaphragm 52 can be positioned parallel to each other, so as to create the sense cavity 42, which may be the area between the sense diaphragm 50 and the boost diaphragm 52. The boost cavity 56 may act to equalize the pressure in between the sense diaphragm 50 and the boost diaphragm 52, thereby urging the pilot seat 44 toward sealed engagement with the hollow valve tube 40, and to help keep the valve assembly in a closed position during normal operation. This area may be filled with nitrogen or another inert, clean gas. The boost diaphragm 52 may be substantially similar in shape and function as the sense diaphragm 50. The boost diaphragm 52 may have a planar surface area, which is the area that makes contact with the gas, equal to or greater than the planar surface area of the sense diaphragm 50, such that the surface area of the boost diaphragm 52 in contact with the gas within the sense cavity 42 is greater than the surface area of the sense diaphragm 50 in contact with the gas within the sense cavity 42.

The relief valve assembly 10 may function in a Normal Mode Operation or in an Abnormal Mode Operation. Under the Normal Mode Operation, the valve diaphragm 30 remains sealed against the valve seat 28 of the pressure vessel 12, such that the valve seat 28 is closed and the sour gas remains in the pressure vessel 12 and is prevented from exiting the main relief valve 14. In practice, the valve diaphragm 30 is utilized as a sealant to maintain the pressure within the main relief valve 14. Thus, under the Normal Mode Operation, the pilot seat 44 remains in its stationary position and does not move.

Under the Normal Mode Operation of the relief valve assembly 10, the gas cylinder 62 can continue to supply the nitrogen gas to the pilot relief valve 34 section of the relief valve assembly 10 at a steady flow rate of about 7 psig. In the Normal Mode Operation, the valve dome 20 contains the nitrogen gas supplied from the gas cylinder 62, the sense cavity 42 of pilot relief valve 34 contains the nitrogen gas supplied from the gas cylinder 62, and the pressure vessel 12 contains the sour gas. Thus, the Normal Mode Operation keeps the sour gas in the pressure vessel 12 separate from the nitrogen gas in the internal components of the pilot relief valve 34. While in the Normal Mode Operation, the equalizing line 38 senses and substantially equalizes the pressure in each of the valve dome 20, the sense cavity 42, and the pressure vessel 12, such that the pressure inside each of the valve dome 20, the sense cavity 42, and the pressure vessel 12 is substantially equal at a pressure of about 3 psig or more and less than or equal to about 7 psig. In certain embodiments, during the Normal Mode Operation, the pilot relief valve 34 contains the nitrogen gas at a pressure of about 7 psig and up to about 10 psig. In practice, the Normal Model Operation is the steady state and near system equilibrium operation of the relief valve assembly 10.

In operation, during the Normal Mode Operation of the relief valve assembly 10, pressure in the pressure vessel 12 can be regulated according to the following steps: (a) sealing the pressure vessel 12 containing sour gas by attaching a main relief valve 14 to an outlet 32 of the pressure vessel 12, the main relief valve 14 having the valve diaphragm 30 that encloses the valve dome 20 and seals against the outlet 32, and the hollow valve tube 40 in pressure communication with the valve dome 20, where the valve dome 20 contains an inert clean gas; and (b) sealing the valve dome 20 by attaching a pilot relief valve 34 with a valve seat 28 to the hollow valve tube 40 so that the valve seat 28 selectively seals the valve dome 20 and the hollow valve tube 40.

Under the Abnormal Mode Operation, the relief valve assembly 10 of the present technology releases excessive pressure inside of a pressure vessel 12. Under the Abnormal Mode Operation, when a pressure in the pressure vessel 12 exceeds a predetermined level, pressure within the sense cavity 42 urges the sense diaphragm 50 and the pilot seat 44 away from the hollow valve tube 40. This allows gas in the valve dome 20 to escape, which in turn allows compression of the valve diaphragm 30 so that it separates from the valve seat 28, thereby allowing sour gas to escape from the pressure vessel 12.

In some embodiments, the main relief valve 14 is operable to open to release the sour gas to the atmosphere through the outlet 32 when the pressure in the pressure vessel 12 exceeds a predetermined level of about 10 psig or more. Thus, for example, the addition of the nitrogen gas, which is supplied by the gas cylinder 62 to the relief valve assembly 10, at a steady flow rate of about 7 psig with an excess pressure of about 3 psig or more within hollow section 16, will result in a total pressure of about 10 psig or more within the main relief valve 14, which will open to release the sour gas. In certain embodiments, the relief valve assembly 10 vents sour gas from the pressure vessel 12, which may be, for example, a pressure tank or a storage tank, when there is excessive internal pressure in the pressure vessel 12 and the valve seat 28, which is capable of being raised, is opened.

In certain embodiments, during the Abnormal Operation Mode, the boost diaphragm 52 may move in conjunction with the sense diaphragm 50 to apply an upward force against the biasing mechanism 46 to raise the pilot seat 44 and release the pressure inside of the pressure vessel. Thus, when a pressure in the pressure vessel 12 exceeds a predetermined level, pressure within the boost cavity 56 urges the boost diaphragm 52 and the pilot seat 44 away from the hollow valve tube 40, which in turn allows compression of the valve diaphragm 30 so it separates from the valve seat 28, thereby allowing sour gas to escape from the pressure vessel 12. The layer of gas within the boost cavity, which is in between the sense diaphragm and boost diaphragm, is operable to boost, or magnify, the upward force on the pilot seat 44, so as to quicken the movement of the pilot seat 44 away from the hollow valve tube 40 than without the presence of the boost diaphragm 52.

In practice, during the Abnormal Mode Operation of the relief valve assembly 10, pressure in the pressure vessel 12 can be regulated according to the following steps (with numbering continued from the steps identified above related to Normal Mode Operation): (c) biasing the valve seat 28 toward the hollow valve tube 40; (d) when pressure within the pressure vessel 12 reaches a predetermined level, moving the valve seat 28 away from the hollow valve tube 40 to allow the inert clean gas to escape from the valve dome 20 via the hollow valve tube 40; and (e) when the valve seat 28 moves away from the hollow valve tube 40, moving the valve diaphragm 30 away from the outlet 32 so that sour gas within the pressure vessel 12 escapes and pressure within the pressure vessel reduces.

During the Abnormal Mode Operation, the equalizing line 38 senses and compares the pressure in the pressure vessel 12 with the pressure in the sense cavity 42 and the valve dome 20. While the equalizing line 38 is sensing, if the pressure inside the pilot relief valve 34 is about 9.3 psig or less, then the biasing mechanism 46 applies a downward force to close the pilot seat 44 towards the hollow value tube 40, which allows expansion of the valve diaphragm 30 so that it unites with the valve seat 28, thereby preventing sour gas form escaping from the pressure vessel 12 and ending the Abnormal Mode Operation. In some embodiments, during the end of the Abnormal Mode Operation and the return to the Normal Mode Operation, the valve diaphragm 30 is operable to unite the valve seat 28 and closes to prevent the sour gas from escaping from the pressure vessel 12 to the atmosphere when the pressure inside the pilot relief valve 34 is about 9.3 psig or less. Thus, for example, the valve diaphragm 30 remains in a closed position when the pilot relief valve 34 has a pressure in between of about 9.3 psig and about 10 psig. In certain embodiments, the valve diaphragm 30 opens when the pilot relief valve 34 has a pressure of about 9.3 psig.

In the method for ending the Abnormal Mode Operation and returning to the Normal Mode Operation of the relief valve assembly 10 by regulating pressure in the pressure vessel 12, steps of operation can include (again, continuing numbering from above): (f) when pressure within the pressure vessel 12 reduces to at or below a predetermined level, the biasing mechanism 46 applies a downward force to close the pilot seat 44 towards the hollow valve tube 40, which allows expansion of the valve diaphragm 30 so that it unites with the valve seat 28, thereby preventing sour gas from escaping from the pressure vessel 12; (g) when the pressure within the pressure vessel is about 10 psig or less and when the pressure inside of the pilot relief valve is about 9.3 psig or less, the valve diaphragm unites with the valve seat and closes to prevent the sour gas from escaping from the pressure vessel to the atmosphere. Although specific pressure values are discussed herein for some embodiments of the technology, it is to be understood that these pressure values are exemplary only, and may vary in other embodiments, such as when the technology is applied in different technical fields.

The method for regulating the pressure (whether in Normal Operation Mode or in Abnormal Operation Mode) within the pressure vessel 12 by utilizing the gas cylinder 62, which contains the nitrogen gas, which is transported to the relief valve assembly 10, as described herein provides advantages for the operation of the relief valve assembly 10. The nitrogen gas maintains the cleanliness of the internal components of the pilot relief valve 34, prevents explosions or other hazards, and protects the internal components of the relief valve assembly 10 from contaminates and deposits, as well as other problems, such as mothballing and purging. The introduction of the nitrogen gas into the relief valve assembly 10 by the gas cylinder 62 maintains the cleanliness of the working environment of the relief valve assembly 10 and prevents dirt accumulation during normal operations and for long time periods, thereby improving the reliability of the relief valve assembly 10.

In effect, the gas cylinder 62 serves as cleaning agent to keep the relief valve assembly 10 clean and free from dirt. The nitrogen gas prevents accumulation within the internal components of the relief valve assembly 10, so that gas flows within the relief valve assembly 10 are not blocked and the mean time between failures (MTBF) of the relief valve assembly 10 in increased. Thus, by utilizing nitrogen gas and improving reliability of the relief valve assembly 10, there can be in-place testing of the relief valve assembly 10, rather than requiring frequent removal of the relief valve assembly 10, which causes unnecessary cost, manpower/technician hours, transportation, and logistics challenges with downtime of the relief valve assembly 10. Moreover, nitrogen gas provides enhanced safety within the relief valve assembly 10, since nitrogen gas is a safer gas to use for cleaning than toxic sour gas.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

What is claimed is:

1. A relief valve assembly comprising:
   a main relief valve positioned adjacent a valve seat of a pressure vessel containing a sour gas, the main relief valve comprising:
      a main valve diaphragm selectively sealable against the valve seat of the pressure vessel, the valve diaphragm enclosing a valve dome containing an inert clean gas; and
      a hollow valve tube in pressure communication with the valve dome; and
   a pilot relief valve in pressure communication with the pressure vessel and the valve dome of the main relief valve, and having a pilot seat selectively sealable against the hollow valve tube, the pilot relief valve comprising:
      a biasing mechanism in communication with the pilot seat to urge the pilot seat toward sealed engagement with the hollow valve tube; and
      a sense diaphragm attached to the pilot seat and enclosing a sense cavity that contains the inert clean gas and is in pressure communication with the valve dome and the pressure vessel so that when a pressure in the pressure vessel exceeds a predetermined level, pressure within the sense cavity urges the sense diaphragm and the pilot seat away from the hollow valve tube releasing the inert clean gas from the valve dome, which in turn allows compression of the valve diaphragm so that it separates from the valve seat, thereby allowing sour gas to escape from the pressure vessel.

2. The relief valve assembly of claim 1, further comprising:
   an equalizing line extending between each of the valve dome, the sense cavity, and the pressure vessel.

3. The relief valve assembly of claim 2, further comprising:
   at least one check valve attached to the equalizing line for separating the sour gas from the inert clean gas.

4. The relief valve assembly of claim 1, wherein the biasing mechanism comprises a spring.

5. The relief valve assembly of claim 1, wherein the valve dome is expandable in a direction perpendicular to a central dome axis between a first relaxed position and a first expanded position.

6. The relief valve assembly of claim 1, wherein the pilot relief valve contains a nitrogen gas at a pressure up to 10 psig.

7. The relief valve assembly of claim 1, wherein the valve diaphragm is operable to separate from the valve seat and opens to release the sour gas to the atmosphere when the predetermined level is 10 psig or more.

8. The relief valve assembly of claim 1, further comprising:
   a boost diaphragm attached to the pilot seat; and
   a boost cavity in pressure communication with the valve dome and the pressure vessel so that when a pressure in the pressure vessel exceeds a predetermined level, pressure within the boost cavity urges the boost diaphragm and the pilot seat away from the hollow valve tube, which in turn allows compression of the valve diaphragm so it separates from the valve seat, thereby allowing sour gas to escape from the pressure vessel.

9. The relief valve assembly of claim 1, wherein the biasing mechanism applies a downward force to urge the pilot seat towards the hollow valve tube, which in turn allows expansion of the valve diaphragm so that it seals against the valve seat, thereby preventing sour gas from escaping from the pressure vessel.

10. An inert clean gas relief valve system for maintaining the cleanliness of internal components comprising:
    a relief valve assembly comprising:
       a main relief valve positioned adjacent a valve seat of a pressure vessel containing a sour gas, the main relief valve comprising:
          a main valve diaphragm selectively sealable against the valve seat of the pressure vessel, the valve diaphragm enclosing a valve dome containing an inert clean gas; and
          a hollow valve tube in pressure communication with the valve dome; and
       a pilot relief valve in pressure communication with the pressure vessel and the valve dome of the main relief valve, and having a pilot seat selectively sealable against the hollow valve tube, the pilot relief valve comprising:
          a biasing mechanism in communication with the pilot seat to urge the pilot seat toward sealed engagement with the hollow valve tube; and
          a sense diaphragm attached to the pilot seat and enclosing a sense cavity that contains the inert clean gas and is in pressure communication with the valve dome and the pressure vessel so that when a pressure in the pressure vessel exceeds a predetermined level, pressure within the sense cavity urges the sense diaphragm and the pilot seat away from the hollow valve tube releasing the inert clean gas from the valve dome, which in turn allows compression of the valve diaphragm so that it separates from the valve seat, thereby allowing sour gas to escape from the pressure vessel;
    a gas cylinder containing the inert clean gas;
    a gas line fluidly connecting the gas cylinder and the relief valve assembly, the gas line for transporting the inert clean gas from the gas cylinder to the relief valve assembly; and
    at least one pressure regulator positioned in the gas line for controlling the flow rate of the inert clean gas from the gas cylinder.

11. The inert clean gas relief valve system of claim 10, wherein the gas cylinder supplies the inert clean gas to the relief valve assembly at a steady flow rate of 7 psig.

12. The inert clean gas relief valve system of claim 10, further comprising at least one check valve positioned in the gas line, the at least one check valve for preventing the inert, clean gas from mixing with the sour gas.

13. The inert clean gas relief valve system of claim 10, further comprising:
    a pressure gauge disposed in between the at least one pressure regulator and the relief valve, the pressure gauge for measuring and displaying the pressure of the inert clean gas as it enters the relief valve.

\* \* \* \* \*